United States Patent
Vogt

(10) Patent No.: US 6,658,837 B1
(45) Date of Patent: Dec. 9, 2003

(54) CHAIN

(75) Inventor: Erhard Vogt, Einbeck (DE)

(73) Assignee: Arnold & Stolzenberg, Einbeck (DE)

( * ) Notice: Subject to any disclaimer, the term of this patent is extended or adjusted under 35 U.S.C. 154(b) by 100 days.

(21) Appl. No.: 10/009,354

(22) PCT Filed: Jun. 2, 2000

(86) PCT No.: PCT/EP00/05083

§ 371 (c)(1),
(2), (4) Date: Nov. 13, 2001

(87) PCT Pub. No.: WO00/75529

PCT Pub. Date: Dec. 14, 2000

(30) Foreign Application Priority Data

Jun. 4, 1999 (DE) .................................... 299 10 372 U

(51) Int. Cl.$^7$ ............................. B21L 9/02; F16G 13/00
(52) U.S. Cl. ...................................... 59/4; 59/5; 59/78
(58) Field of Search .................. 59/4, 5, 35.1, 78; 474/206

(56) References Cited

U.S. PATENT DOCUMENTS 1,722,861 A * 7/1929 Renshaw ........................ 59/4
1,925,055 A * 8/1933 Mize ............................... 59/5
5,857,318 A 1/1999 Odai et al.

FOREIGN PATENT DOCUMENTS

DE     1 966 980     8/1967
EP     0 257 661 A2     8/1987

* cited by examiner

Primary Examiner—David Jones
(74) Attorney, Agent, or Firm—Brinks Hofer Gilson & Lione

(57) ABSTRACT

The invention relates to a chain that consists of chain members with respective two inner flat links (1) that are parallel with respect to each other and two bushes (2) that are rigidly located between the inner flat links and that link two ends of said links each. The chain further comprises outer flat links (5) that interlink the chain members. Said outer flat links are parallel with respect to each other and hinge the ends of two adjacent chain members that face each other by rigidly linking each of the opposing ends with one respective end of the pin. Said opposing ends link two ends of two outer flat links which in turn link two chain members. Said pin is guided through a bush and is rotatably received therein. The bushes protrude at their two ends from the outer faces of the inner flat links that face the respective outer flat links and said protrusion is provided with at least one lubricant passage (6) that extends from the outer diameter to the inner diameter of the bush.

6 Claims, 1 Drawing Sheet

CHAIN

BACKGROUND OF THE INVENTION

The present invention relates generally to chains, and particularly to chains composed of a plurality of chain members each having two inner flat links that are parallel to one another, and two bushes that are rigidly disposed between the inner flat links respectively connecting two ends of same to one another. The present invention also relates to chains having outer flat links connecting the chain members in such a way that outer links, which are parallel to one another, hinge together the facing ends of two adjacent chain members with the two ends of two outer flat links connecting two chain members at each of these facing ends being rigidly connected in each case to one end of a bolt guided through and rotatably mounted to a bush.

In the re-lubrication of such chains, the lubricant is applied to the chain e.g. by drip-feed lubrication from outside. As a result of the play between the inner and outer flat links, the lubricant can also penetrate through the gap between said links and from there into the gap between the bolt and the bush. During operation, however, the play between the inner and outer flat links on several joints is set on one side and does not alter even as the chain circulates. This leads to the flow of lubricant in these joints not being optimal, such that rubbing corrosion, increased wear and premature failure of an affected joint can occur. From DE-GM 1 966 980 is known a steel flat link chain in which the outer flat links are rotatably mounted with bolts in bushes pressed securely into the inner links. In the spacing between the inner and outer flat links is provided in each case a flexible seal, through which an annular chamber lying inside the spacing is formed to receive lubricant and is sealed towards the outside together with the adjoining annular gap present between the hinge bolt and the bush. However this chain has the disadvantage that the seal, preferably consisting of plastics material, is subjected to relatively high wear and also that re-lubrication is not possible.

Furthermore, in EP 0 257 661 B1 is disclosed a roller chain to which lubricating oil can be applied, and in which the outer and inner flat links are connected to one another by means of joints consisting of bolts and sleeves and surrounded by rollers. In the peripheral direction of the roller there is provided a limited gap between at least one end face of the roller and the adjacent inner flat link and at least one radial oil feed aperture, aligned with the gap, is provided in each sleeve. In order to guarantee sufficient lubrication of the joints even under unfavourable operating conditions, the gap formed by at least one spacer element provided between the end face of the roller and the inner flat link is longer in its overall length in the peripheral direction than the peripheral extension of the spacer element or elements. This guarantees that, as a result of the relative movements between the roller and the inner flat link, the direct access to the oil feed aperture of the sleeve is exposed again and again and thus the lubricating oil can enter the gap between the bolt and the sleeve. However this chain is relatively expensive to manufacture.

It is therefore the object of the present invention to create a chain comprising chain members each having two inner flat links, parallel to one another, and two bushes rigidly disposed between the inner flat links and respectively connecting two ends of same to one another, and comprising outer flat links connecting the chain members, wherein respectively two outer flat links, parallel to one another, hinge together the facing ends of two adjacent chain members, by respectively two ends of two outer flat links connecting two chain members at each of these facing ends being rigidly connected in each case to one end of a bolt guided through a bush and rotatably mounted in same, which chain guarantees sufficient lubrication between its parts which are moveable in relation to one another, and which is simple to manufacture.

SUMMARY OF THE INVENTION

The object is achieved according to the present invention by providing bushes that protrude at their two ends beyond the outer faces of the inner flat links that face the respective outer flat link. The protrusion so formed has at least one groove-shaped lubricant passage extending from the outer diameter to the inner diameter of the bush so that lubricant can penetrate into the gap between the bolt and the bush.

Because the bushes protrude at their two ends beyond the outer faces, facing the respective outer flat link, of the inner flat links, and the protrusion so formed has at least one lubricant passage extending from the outer diameter to the inner diameter of the bush, it is guaranteed that there is constantly a sufficient distance between the facing surfaces of the inner and outer flat links and that the lubricant passage located in the gap so formed forms a non-closeable access to the annular gap between the bolt and bush for the lubricant. This effect can be maintained in a simple manner since merely the bush has to be slightly lengthened on both sides and depressions, configured preferably in the shape of grooves, have to be produced in these extensions.

BRIEF DESCRIPTION OF THE DRAWINGS

The invention is explained in greater detail below with the aid of an embodiment represented in the Figs. These show.

DESCRIPTION OF PREFERRED EMBODIMENTS

Figure 1:
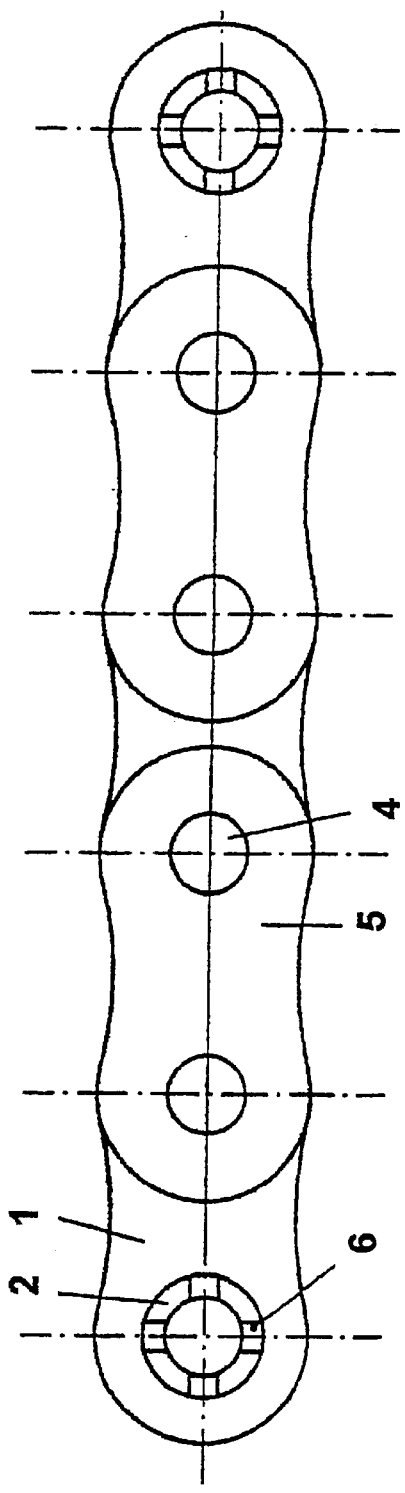
FIG. 1 a portion of a chain in side view.
Figure 2:
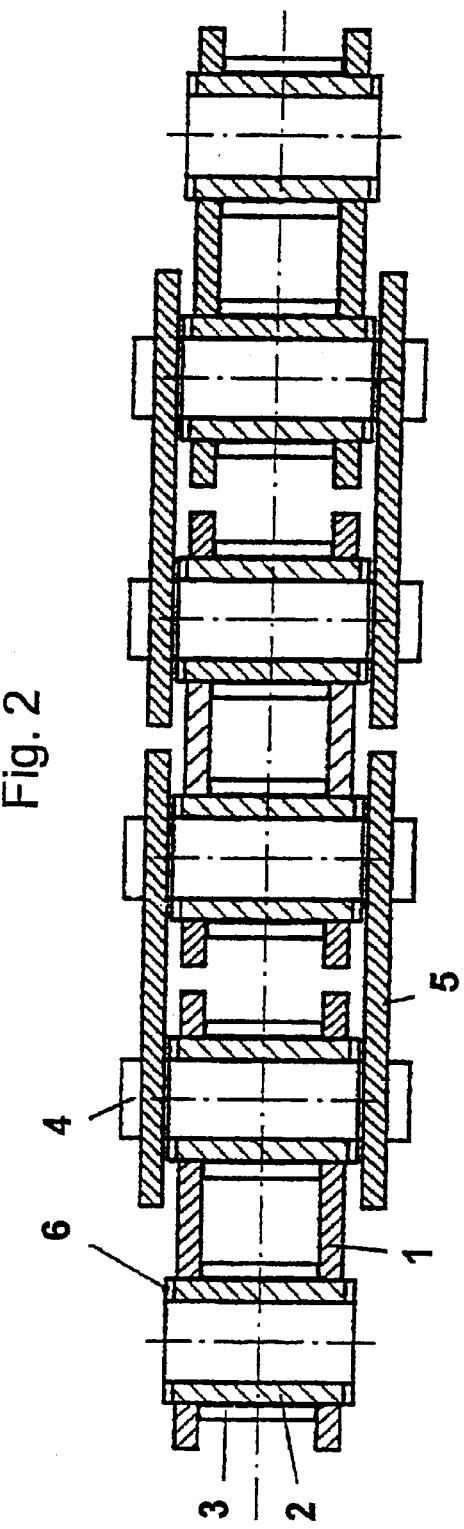
FIG. 2 the chain portion represented in FIG. 1 in horizontal longitudinal section.

The chain shown has two inner flat links 1 per chain member, which each have circular apertures at their two ends. Into one aperture in each of two inner flat links 1 is respectively pressed one end of a bush 2 so as to rotate with the link, such that the inner flat links 1 of a chain member are held parallel to one another at a pre-determined spacing by two bushes 2. On each bush 2, a roller 3 is rotatably arranged between the inner flat links 1. In the bushes 2 are rotatably mounted bolts 4, the ends of which protrude from the bushes 2. The bolts 4 carry outer flat links 5 which also have circular apertures at both their ends, into which respectively one end of a bolt is pressed so as to rotate with the flat link. The two facing ends of a chain member formed by two inner flat links 1, two bushes 2 and two rollers 3 are thus hinged to one another by two parallel outer flat links 5.

This ensures that the annular gap between the bolt 4 and the bush 2, which can be swivelled in relation to the former, is sufficiently supplied with lubricant, and the bush 2 protrudes on both sides beyond the outer surface of the inner flat links 1, such that when, as a result of the possibility of movement between bolt 4 and bush 2, the inner surfaces of the outer flat links 5 respectively knock against the facing end surface of the bush 2, a spacing, corresponding to the protrusion of the respective bush end remains between the facing surfaces of the inner and outer flat links 1 or respectively 5.

However, so that lubricant supplied from the outside can reach between the bush 2 and the bolt 4, the respective protrusions of the bushes 2 are provided with grooves 6 extending from the outer circumference to the inner circumference, through which grooves the lubricant can reach the bolt 4 and then penetrate into the gap between the bolts and the bush 2. The number and the configuration of the grooves 6 are preferably adapted to the respective circumstances, such as for example the requirement for lubricant, the viscosity of the lubricant etc. In the example shown, four grooves 6 running in a radial direction are provided, which respectively have a spacing of 90°. The depth of the grooves 6 corresponds expediently to the size of the protrusion of the bush 2 beyond the outer surface of the inner flat links 1.

The number of grooves 6 can be greater or smaller than four. They can also run at an angle in relation to the radial direction. This can be advantageous insofar as by this means, when the chain moves, an additional conveying effect for the lubricant can be achieved. Furthermore the depth of the grooves 6 can alter in the radial direction of the bush 2.

In the above-mentioned embodiment, the chain is represented as a roller chain. However the invention is not limited to same, but can also be configured without using the rollers 3, for example as a bush chain.

What is claimed is:

1. Chain comprising: a plurality of chain members, each chain member having two inner flat links arranged parallel to one another, and two generally cylindrical bushes disposed between the inner flat links, the two inner flat links connecting the two bushes of a given chain member to one another, the bushes having end portions extending laterally outside outer surfaces of the inner flat links, a bolt rotatably extending through each bush, the bolts having ends extending laterally beyond the end portions of the bushes, and pairs of parallel outer flat links having ends fixed to the bolt ends so that each pair of parallel outer flat links connects adjacent chain members together in a series, the outer ends of the bushes including at least one lubricant slot extending from an outer radius to an inner radius of each bush end portion, each lubricant slot having a depth that varies between the outer and inner radii of each bush.

2. Chain according to claim 1, wherein the at least one lubricant slot comprises a plurality of lubricant passages arranged at equal intervals around the circumference of the bush.

3. Chain according to claim 2, wherein each lubricant passage extends in a radial direction between the outer and inner radii of each bush.

4. Chain according to claim 2 or 3, wherein each lubricant passage extends at an angle to the radial direction of the bush.

5. Chain according to one of claims 1 or 2, further comprising a roller arranged on each bush between inner flat links.

6. Chain according to one of claims 1 or 2, wherein the chain is configured in the form of a bush chain.

* * * * *